(12) United States Patent  (10) Patent No.: US 6,667,442 B1
Hilligoss  (45) Date of Patent: Dec. 23, 2003

(54) ELECTRIC UTILITY CROSS ARM

(75) Inventor: Lloyd Hilligoss, South Lyon, MI (US)

(73) Assignee: Patent Holding Company, Ltd., Fraser, MI (US)

( * ) Notice: Subject to any disclaimer, the term of this patent is extended or adjusted under 35 U.S.C. 154(b) by 0 days.

(21) Appl. No.: 10/205,434

(22) Filed: Jul. 25, 2002

(51) Int. Cl.$^7$ ............................................. H01B 17/20
(52) U.S. Cl. .................. 174/174; 174/40 R; 248/219.3; 248/226.12
(58) Field of Search ........................ 248/68.1, 49, 74.2, 248/58, 65, 218.4, 217.1, 219.3, 226.12, 227.3; 174/174, 40 R, 45 R, 149, 172, 155, 154, 158 R, 175, 173, 43; 52/40, 697, 720.1

(56) References Cited

U.S. PATENT DOCUMENTS

| 1,149,282 | A | * | 8/1915 | Peirce, Jr. ................. | 174/45 R |
| 1,239,142 | A | * | 9/1917 | Van Diest .................... | 52/697 |
| 3,217,086 | A | * | 11/1965 | Taylor ...................... | 174/40 R |
| 3,803,345 | A | * | 4/1974 | Spaeth, Jr. .............. | 174/149 R |
| 4,682,747 | A | * | 7/1987 | King et al. ................ | 248/68.1 |
| 4,940,857 | A | * | 7/1990 | Giroux ........................ | 174/174 |
| 5,772,158 | A | * | 6/1998 | Blanding .................... | 248/49 |
| 5,945,636 | A | * | 8/1999 | Sakich et al. ............... | 174/174 |
| 5,981,879 | A | * | 11/1999 | Blanding .................... | 174/168 |
| 6,027,082 | A | | 2/2000 | King | |
| 6,229,086 | B1 | * | 5/2001 | Blanding ..................... | 174/43 |
| 6,347,488 | B1 | * | 2/2002 | Koye ........................... | 52/40 |
| 6,555,999 | B1 | * | 4/2003 | Lindsey et al. .......... | 324/76.11 |

* cited by examiner

Primary Examiner—Ramon O. Ramirez
Assistant Examiner—Tan Le
(74) Attorney, Agent, or Firm—Welsh & Katz, Ltd.

(57) ABSTRACT

A cross-arm member constructed of lightweight plastics or resins and comprising a structural member providing a lightweight means of supporting electrical transmission wires. The cross-arm member of the preferred embodiment is constructed using a single mold design, having a tongue and groove configuration, such that the number of different members is reduced and construction of the cross-arm is facilitated and the end device is strengthened. The device is designed in a modular manner permitting the rapid and easy exchange of key components. Key components are further held in place by simple friction fittings.

22 Claims, 5 Drawing Sheets

ELECTRIC UTILITY CROSS ARM

FIELD OF THE INVENTION

The present invention concerns electric utility cross-arms made of lightweight insular materials and having the added qualities of high-strength, ease of construction and repair and durability. More particularly the present invention concerns improvements to cross-arms that permit the quick repair and/or upgrading of electrical service components, while providing high-strength and lightweight characteristics, as well as durability that exceeds that of traditional wood cross-arm systems by two to three times.

BACKGROUND OF THE INVENTION

Electrical transmission wires require the use of transmission or utility poles that carry the means, typically cross-arms, to permit the electrical transmission wires to be strung from pole to pole so that the electricity can be taken from its point of creation to its point of use. In order to accomplish this, power companies, and others, have used cross-arms of wood, steel, composite materials and concrete to carry power lines. Typically the cross-arms carry electrical insulators often made of glass or other non-conductive material which provide a degree of insulation between the cross-arm and the electrical transmission cables. With prior art cross-arms and insulators, construction methods required that certain insulator be used on certain cross arms for certain situations and conditions. When conditions or situations changed, the cross arms and/or the insulators are required to be changed to accommodate the changes. Often times such changes required that a utility worker climb a utility pole and remove cross arms, insulators and other equipment, using construction techniques that are not easy to do and are particularly not easy to do at the heights that such wires are found.

U.S. Pat. No. 6,027,082 discloses a convertible electric utility cross-arm insulator. The '082 patent discloses a device and method for converting such cross arms so that they can accommodate a number of different types of utility situations. The '082 patent further teaches the use of plastic and/or resin cross-arms which provide a lightweight, electrically insulated and durable means of holding electrical transmission wires onto poles and permitting the stringing of transmission wires over great distances. The '082 patent discloses means to be able to convert a cross-arm from a single line carrier to a double or triple line carrier. The device uses insulating members with threadings, used in association with wire support devices having internal threadings, that permit the support members to be added or removed by screwing or unscrewing the support member from the insulator. In this manner, the cross-arm can be changed, to accommodate different configurations of wires, more quickly than prior art cross-arm members, where the insulator and wire support are more permanently attached to each other. U.S. Pat. No. 6,027,082 is incorporated herein, in its entirety, by reference.

It will be seen, however, that the device disclosed in the '082 patent has many inherent flaws that make its use, in place of prior art cross-arms, problematic. Such problems, as the need to unscrew or screw parts to replace them, typically at great heights on an utility pole, is an example of the deficiencies of the device of the '082 patent. Further, in the use of composite materials, typically plastics, such cross arms which are often two part molded products are typically filled, with such products as expanding foam, in order to keep water (which can have deleterious effects on the system) out of the body of the cross-arm. The use of such fillers adds cost to the production of the devices and weight to the cross-arms.

In some cross-arms of the prior art, it has been necessary to use fillers, such as lead filled nuts, as an interference to allow the insulator to be turned and maintained such that the path of the wire on the insulator is perpendicular to the cross-arm. The use of such a system to permit the wires to run perpendicular to the cross-arm causes difficulties in alignment during the setup of cable systems and allows for variability in the settings. Further, there is an added element of increased weight and cost in the use of fillers.

SUMMARY OF THE INVENTION

In accordance with the present invention, a lightweight electrical utility cross-arm for quick and easy assembly of an electrical transmission member for carrying electrical wires is provided. The cross-arm member comprises at least one generally vertical opening for receiving at least one insulating member. The cross-arm system further comprises a clip element for holding the insulating member inside of the generally vertical opening in the cross-arm. A wire holding member for insertion onto said insulating member is provided to hold an electrical transmission line in place and in a desirable position, generally perpendicular to the plane of the cross-arm. The insulating member being held in place on the insulating member by the weight of an electrical wire.

In a preferred embodiment the cross-arm member is constructed of a plastic or resin material and is typically created in a molding process. In the construction of the cross-arm member of the preferred embodiment, a single mold is used and is designed so that tongues and grooves are intermittently created in the moldings. The cross-arm is created from two molding pieces (which can be made from the same mold or an identical mold) placed open ends together, such that the tongues and grooves end up opposite each other such that the tongues and grooves fit together to help hold the cross-arm members together. In a preferred embodiment, the cross-arm tongues are created on one half of each mold and the grooves are created on the other half, such that when the two cross-arm pieces (preferably made from the same mold) are placed facing each other, tongues of one molded piece correspond with grooves of the other molded piece, permitting the pieces to fit together and interlock.

The moldings are created such that flanges and beams are created so that a lightweight, honeycomb like structure is created, permitting great strength in the cross-arm. In the preferred embodiment, the cross-arm has a generally diamond shape, adding to the overall strength of the member, and is constructed with generally vertical openings at the top most section of the generally diamond shape and at the two side arms, such that a configuration of one, two or three transmission wires may be made with the cross-arm member.

In a preferred embodiment of the present invention insulating rods, having a tongue or tab at one end, such that it can fit into a groove or slot in the cross-arm, are provided. In a preferred embodiment, the tab is specifically designed to assure correct wire-groove rotation and orientation. The insulating rods further comprise notches near their bottom ends, such that a cotter-type spring pin, "C" or "U" style clip, may be placed onto the notches to keep the insulating rod in place. In a preferred embodiment, the notches are generally horizontal and the clip are typically "C" or "U"

shaped clip. The cross-arm of the present invention defines a slot; located adjacent to the generally vertical cylindrical opening, such that when insulating rod is placed into the generally vertical opening, and the tongue or tab of the insulating member is fitted into the groove or slot in the cross-arm at the base of the generally vertical opening, the cotter-type spring pin may be inserted into the slot in the cross-arm, through the notches in the insulating member, such that the insulating rod is locked into the cross-arm until it is desired that it be removed by pulling the "C" or "U" clip out. In this way, repair or replacement of component parts of a cross-arm member system, such as insulating rods or wire supports, requires only a minimum of time atop an utility pole and little or no skill to lift the support off of the insulating rod, remove the "C" or "U" clip, and replace the rod and support. Addition of a rod, pin and support to a cross-arm member to accommodate the addition of a new electrical wire, is also facilitated.

The "C" or "U" clip of the preferred embodiment of the present invention is typically constructed so that it comprises a generally flat portion having two elongated tines emerging therefrom. In a preferred embodiment the tines are designed such that the spring-clip, when engaged, is always under tension so as to prevent its becoming disengaged. In a preferred embodiment, the clip comprises a series of undulations that permit it to be better locked into place until removal is desired.

The slot or groove within the generally vertical opening, in a preferred embodiment, is constructed such that it ramps downwardly from the center of the slot to the edge, near the outside wall of the cross-arm body proper (forming a generally inverted V-shaped). The outside wall of the cross-arm is, further, provided with a weep-hole opening intersecting the slot or groove. In this manner, any water entering the cross-arm through the generally vertical opening, or any other adjacent openings, (by means of precipitation or the like) can be naturally eliminated. The slot or groove thereby performs the dual function of permitting the mating of the insulating rods with the cross-arm and as a means to drain any fluids from within the cross-arm body.

In a preferred embodiment of the present invention, insulating wire holders having a simple cylindrical opening created through the center bottom are used. The insulating wire holders are simply slid onto the insulating members to make a simple friction fit, generally held together by the weight of the electrical transmission cable placed thereon.

A more detailed explanation of the invention is provided in the following description and claims and is illustrated in the accompanying drawings.

DETAILED DESCRIPTION OF THE ILLUSTRATIVE EMBODIMENT

Figure 1:
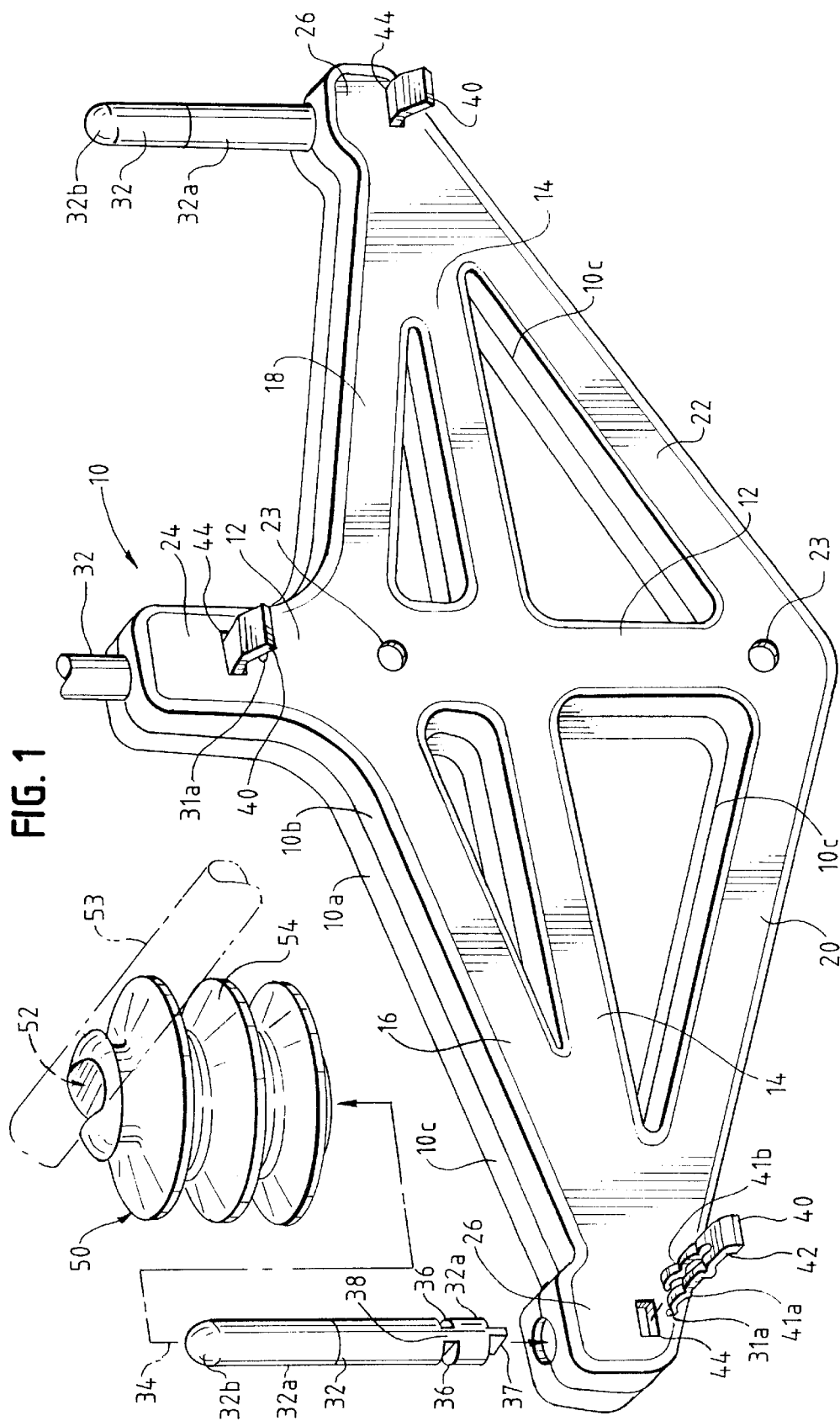
FIG. 1 is a perspective view of the cross arm of the present invention with insulator pins and a schematic representation of the quick installation method for the insulator pins and members.

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of an Illustrative Embodiment") relates to a requirement of the United States Patent Office, and should not be found to limit the subject matter disclosed herein.

Referring to the drawings, FIG. 1 shows a perspective view of a cross-arm 10 of the present invention. It will be seen that cross-arm 10 comprises a vertical member 12 and a horizontal member 14, crossing vertical member 12. Cross-arm 10 further comprises an upper support arms 16 and 18 and lower support arms 20 and 22. Cross-arm 10 also comprises a neck support 24 and two arm supports 26, which will be described in greater detail below. Cross-arm 10 further comprises openings 23, of a type and manner well known in the art, to permit the attachment of cross-arm 10 to a utility pole (not shown). It will be understood by persons having skill in the art that cross-arm 10 can be constructed of a number of different materials having characteristics that will provide strength, durability and desirable weight, without departing from the novel scope of the present invention. In a preferred embodiment, cross-arm 10 is constructed using a molding process, of a type well known in the art, using high strength plastic resins such as thermoset or thermoplastic resins. In another preferred method of construction, cross-arm 10 is constructed using either blow-molding methods or injection molding methods. In the illustrative example, it will be seen that cross-arm 10 is created in two sections (front section 10a and rear section 10b) that are joined, using means and methods well known in the art, along a seam 10c. It will be understood by persons having skill in the art that the two sections (10a and 10b) of cross-arm 10 may be joined together using such means and methods as adhesives or fasteners and welding and other methods, without departing from the novel scope of the present invention.

Referring to FIG. 1, it will be seen that neck support 24 and arm supports 26 each define a generally cylindrical opening 30, into which an insulating member 32 may be placed. In a preferred embodiment, insulating member 32 comprises an elongated cylinder portion 32a, a rounded top portion 32b and an end portion 32c. Member 32 further comprises a longitudinal axis 34, and a pair of notches 36 defined, diametrically opposed to each other, near end 32c of member 32. Notches 36 are made such that a thin portion 38 of the diameter of member 32 remains. In a preferred embodiment notches 36 are defined diametrically apart from each other at the same position along axis 34 of member 32. Notches 36 are defined such that a "C" or "U" style clip pin 40 of a given thickness 42 can be snuggly held within notches 36 when member 32 is in place, as will be described in greater-detail below.

Member 32 further defines a reduced cross-section area tab or tongue 37 which rests in slot or groove 31 (FIG. 3, FIG. 4) within openings 30 in cross-arm 10. When member 32 is in place in opening 30, notches 36 and thin portion 38 rest at the level of slots 44, defined in both the front 10a and rear 10a cross-arm sections. Tab or tongue 37 permits the easy placement of member 32 within opening 30 such that notches 36 lineup with slots 44. While a generally tongue 37 and groove 31 connection is shown, it will be understood by persons having skill in the art that any type of connection, or shape of tongue and slot, permitting member 32 to be aligned in opening 30 in the manner described, can be used without departing from the novel scope of the present invention. In a preferred embodiment, member 32 is made using an over-molding process. In such a process the formation of member 32 with a rounded end 32b aids in the production of member 32. Further, as will be understood by persons having skill in the art, the creation of rounded head 32b provides for a reduction of hoop stresses on member 32 in its use on cross-arm 10, in association with a wire holder 50 (the use of wire holder 50 is discussed in greater detail below). It will be understood that a member 32 may be made with a flat head or a head having any desired shape, using materials other than the thermoset and/or thermoplastic materials used in one of the preferred embodiments. Such materials as steel, or other metals, wood or other materials, natural or synthetic, may be used with out departing from the novel scope of the present invention. Such materials will, typically, add weight and increased cost to a cross-arm so constructed.

Figure 6:
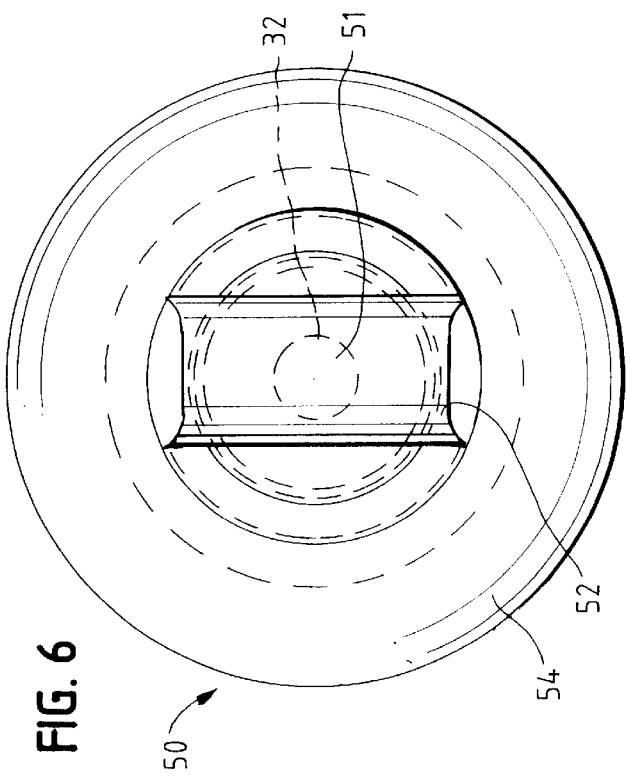
FIG. 6 is a top plan view of the wire support member and insulator of FIG. 5.
Figure 7:
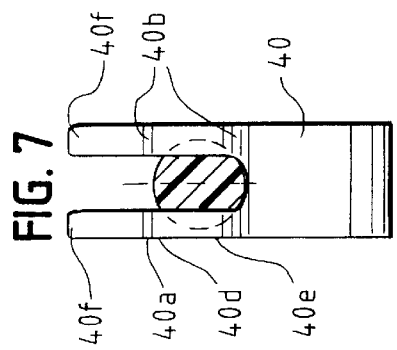
FIG. 7 is a cross-sectional view, taken along the plane of line 7—7 of FIG. 5, showing the spring clip of the present invention.
Figure 5:
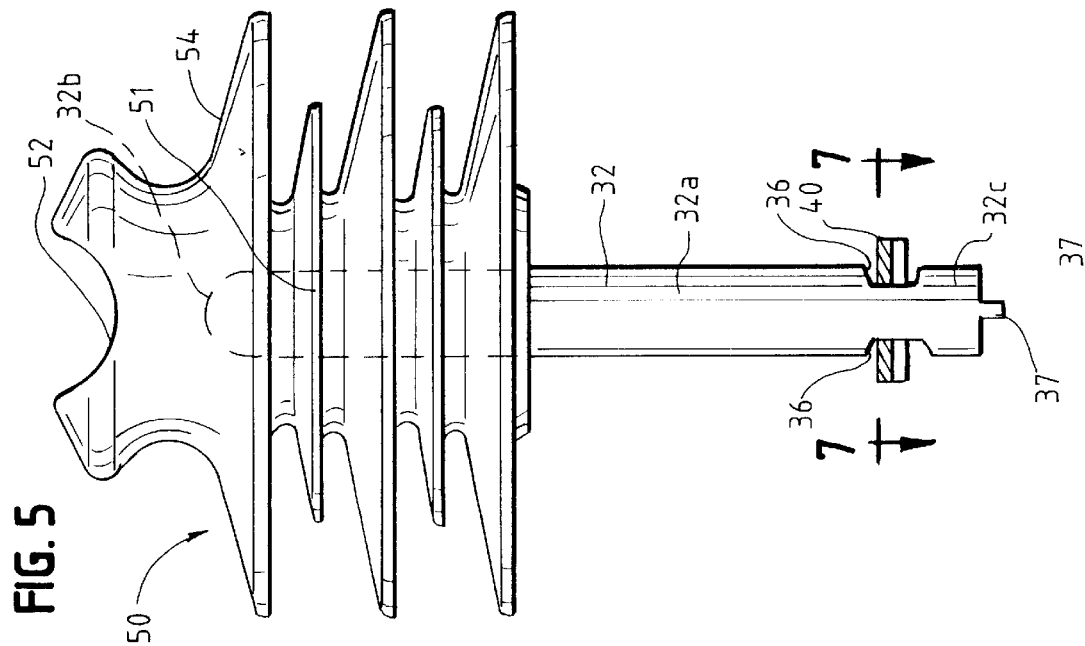
FIG. 5 is a cross-sectional view, taken along the plane of line 5—5 of FIG. 2, of the wire support member, insulator member and spring clip shown in FIG. 2.

As seen in FIG. 1, and more clearly in FIGS. 5 and 6, an insulating wire holder 50 is provided with a wire rest section 52, on which a transmission cable 53 may be laid, and sections 54, which can be conically shaped or disk shaped depending on the application and desires of the user. In U.S. Pat. No. 6,027,082, which has been incorporated herein by reference, sections 54 are referred to as "watershed rings". It will be understood by persons having skill in the art that wire holder 60 may be of any variety of types and shapes presently available or of a type and shape having similar characteristics without departing from the novel scope of the present invention. Wire holder 50 provides a means to hold a cable 53 in position on cross-arm 10 while insulating the wire from any metal or other conducting elements. While prior art wire holders typically required that the wire holder include a manner of attachment to a holding member (such as member 30) such as interior threadings to cooperate with exterior threadings of insulating member, wire holder 50 of the present invention is constructed solely with a cylindrical shaped opening 51 formed within. In the operation of the device of the present invention, member 32 is inserted into one opening 30 of cross-arm 10 and wire holder 50 is simply placed thereon. It will be seen that wire holder 50 is held in place, on member 32, by the weight and positioning of cable 52. Construction and repair is thereby facilitated by the friction-only fit of the various components of the device of the present invention, rather than requiring that the various components be fastened together by various means, including threadings.

As seen in FIG. 1, when member 32 is inserted into cross-arm 40 and correctly seated therein, as described above, "C" or "U" style clip 40 can then be inserted through opening 44 in cross-arm 10, such that the tines of clip 40 slide into slots 36 of member 32, holding member 32 in place. It will be seen that clip 40, in a preferred embodiment, can include interference detents 40a and 40b so as to provide extra, or redundant, retention means.

Figure 2:
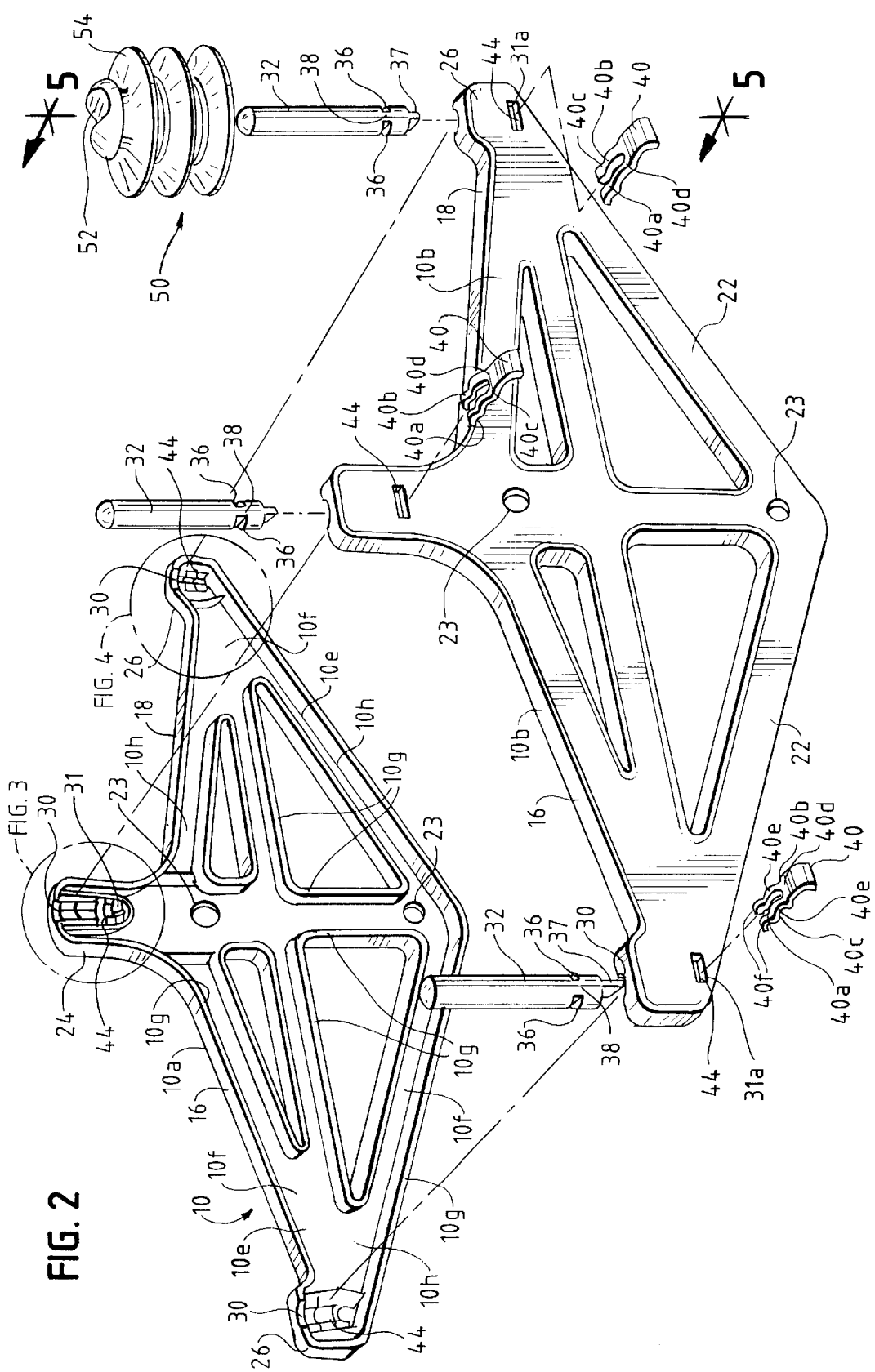
FIG. 2 is a perspective view of the parts of the cross-arm and component parts of FIG. 1, schematically representing the manner of assembly of the device of FIG. 1.

Referring now to FIG. 2, it will be seen that in a preferred embodiment, elements 10a and 10b of cross-arm 10 are identical in form. In this manner the number of parts is reduced and the difficulty of identify parts for assembly is removed. In a preferred embodiment of the present invention both elements 10a and 10b are constructed using identical molds. It will be seen in FIG. 2 and more particularly in FIGS. 3 and 4, that the interior space 10e of cross-arm 10 is formed such that a substantial interior area 10f is hollowed-out and the edges 10g, which are substantially perpendicular to the walls 10h of cross-arm 10, form structural elements in the form of a lattice structure. The use of structural elements 10g along with hollowed-out sections 10e provides a lightweight yet substantially strengthened cross-arm 10.

Figure 3:
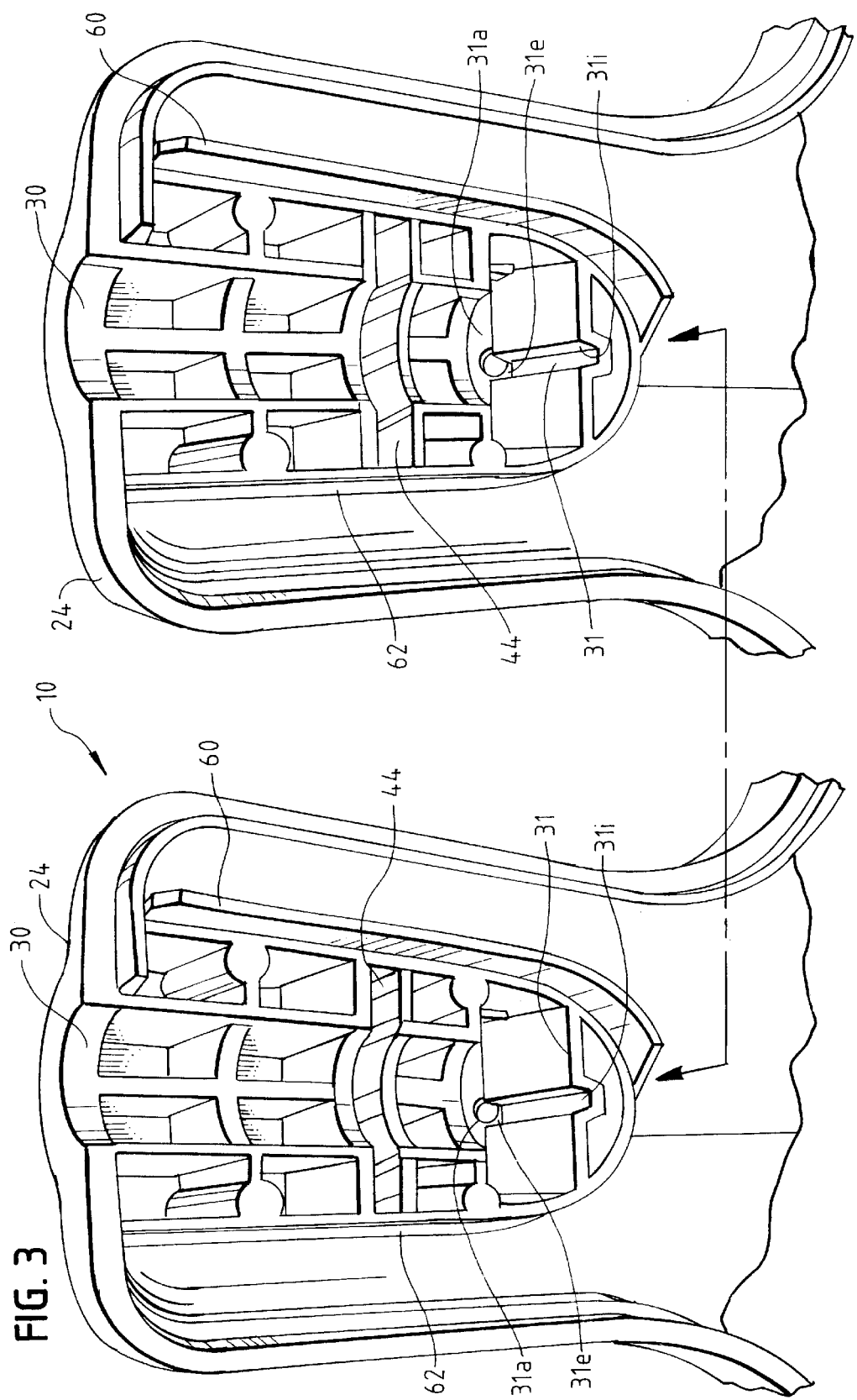
FIG. 3 is a perspective view of the front and back sections of the upper support neck of the device of FIG. 2, broken away to show the details of the parts and the manner of their assembly.

As shown in FIG. 3, and discussed in greater detail below, such molding and ease of assembly is facilitated by the novel inclusion of items such as connector tongues 60 and connector grooves 62 molded into elements 10a and 10b of cross-arm 10. The inclusion of tongue and groove parts on elements 10a and 10b, permits the joinder of these identically molded elements. When the elements are removed from their molds and made to face one another, the tongues of one element will be aligned with the grooves of the other element allowing the units to be joined together. In addition to ease of joinder, the creation of tongues 60 and grooves 62 permits the parts of cross-arm 10 to be placed such that the seal between the two parts is generally in a compression mode, providing greater strength and durability of the system. Prior art systems having merely a system whereby a face of one mold is adhered (using adhesives) to the face of another, typically results in the two parts eventually separating at the seems due to the natural shearing forces to which the cross-arm parts are subjected. It has been found that such separation is the primary mode of failure of such prior art cross-arm structures.

It will be understood by persons having skill in the art that use of adhesives or fasteners, or other means, manner or methods, to maintain the joinder of element is a desired next step in the construction of cross-arm 10. It will be further understood by persons having skill in the art that elements 10a and 10b of cross-arm 10 can, instead be created as a single molded element, in for example a blow-mold form, eliminating the need to assemble the cross-arm after molding, without departing from the novel scope of the present invention.

It will be seen, in FIG. 3, that groove 31 is constructed such that the interior end 31i of groove 31 is slightly elevated in comparison with the exterior end 31e of groove 31 (that is, the groove ramps down from the center of cross-arm 10 to the outside walls of cross-arm 10). Further a weep hole or opening 31a is defined in cross-arm elements 10a and 10b, adjacent to groove exterior end 31e, such that groove 31 is in connection with opening 31a. In this manner, during the use of the device of the present invention, any water (such as rain or other precipitation) entering cross-arm 31 through openings 30 or 44 can be eliminated from the interior of cross-arm 10 through opening 31a. In another preferred embodiment, further openings 31f are included to provide additional drainage at lower levels of cross-arm 10. The additional openings 31f function as a redundant fail-safe permitting water to be shed through the bond flange 70.

Figure 4:
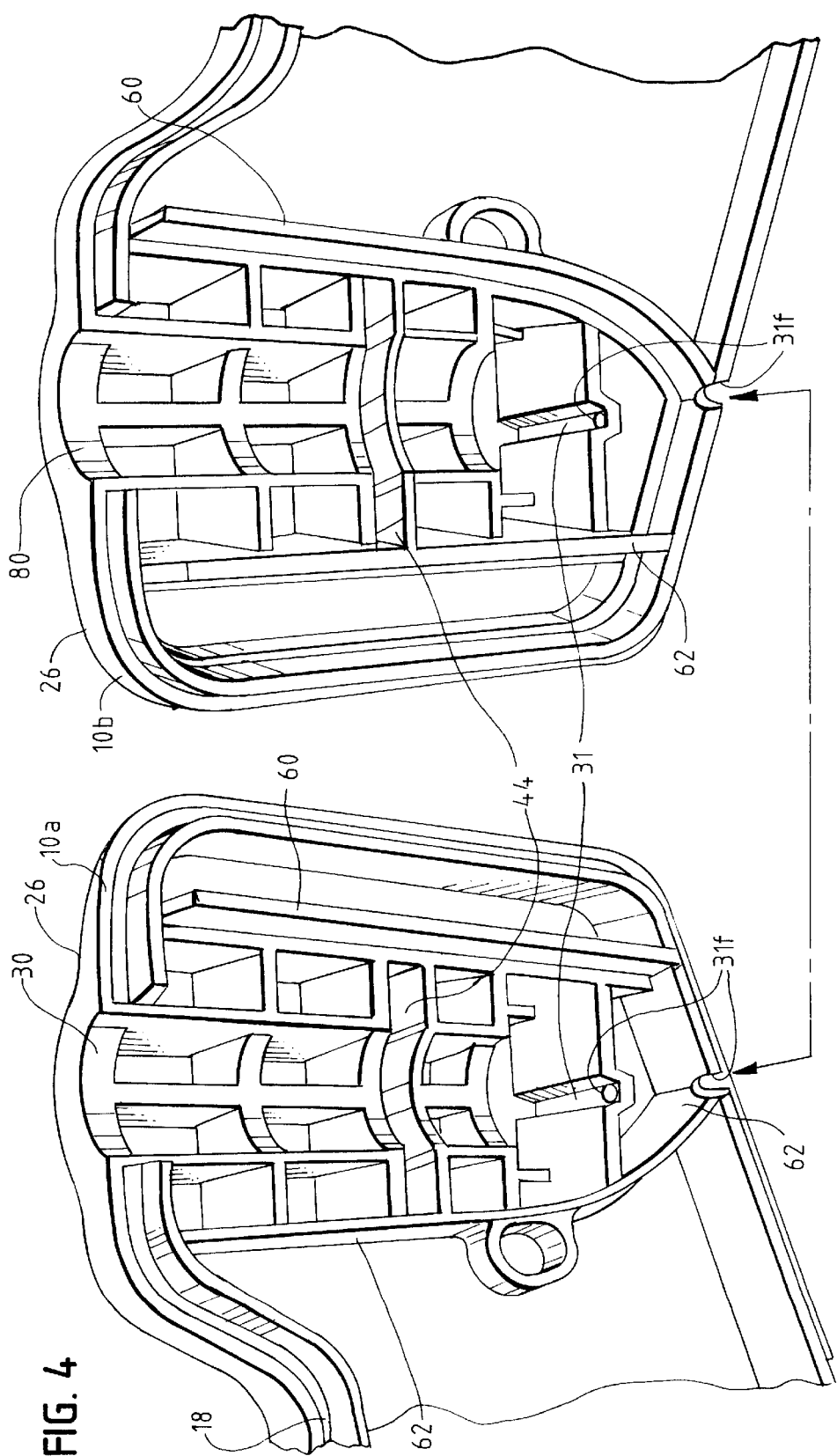
FIG. 4 is a perspective view of the front and back sections of one of the two lateral arm supports of the device of FIG. 2, broken away to show the details of the parts and the manner of assembly.

Referring now to FIGS. 3 and 4, neck support 24 and arm supports 26 are shown in greater detail. It will be seen that, as in the other sections of cross-arm 10, tongue 60 and groove 62 moldings have been created in the moldings of the various sections, providing for the quick and easy assembly of cross-arm 10. Further, as a result of the use of identical molds to create both elements 10a and 10b, slots 44 are seen to be formed in both sections 10a and 10b of cross-arm 10. While this configuration causes an extra slot 44 to be created in cross-arm 10 sections, it permits the fitting of spring clip 40 into either side of cross-arm 10, aiding in the quick construction and/or repair of cross-arm 10. As a result of slots 44 being on both sides, the repair/construction personnel can climb the utility pole on either side of cross-arm 10 to work on the device of the present invention.

Although an illustrative embodiment of the invention has been shown and described, it is to be understood that various modifications and substitutions may be made by those skilled in the art without departing from the novel spirit and scope of the invention.

What is claimed is:

1. A lightweight electrical utility cross arm for quick and easy assembly of an electrical transmission member for carrying electrical wires, comprising:
   a cross-arm member having a first opening;
   at least one insulating member for insertion into said first opening of said cross-arm member;
   a means for holding said insulating member in said first opening;
   a wire holding member for insertion onto said insulating member, said wire holding member being held in place on said insulating member by the weight of an electrical wire.

2. The cross-arm member of claim 1, wherein the cross-arm is constructed of plastic.

3. The cross-arm member of claim 1, wherein the cross-arm is constructed of polymer resin system.

4. The cross-arm member of claim 1, wherein the means for holding said insulating member in said first opening is a dip element.

5. The cross-arm member of claim 1, wherein the cross-arm is generally comprised of two halves attached together, and wherein a single, identical mold is used to form both of the two halves.

6. The cross-arm of claim 5, wherein each half comprises a plurality of tab elements and a plurality of slot elements such that when two halves are assembled together, the tab and slot elements of one of said halves interact with corresponding ones of the slot and tab elements of the other of said halves.

7. The cross-arm of claim 6, wherein the tab and slot elements of each of said halves, when assembled together, form a compression-type bond.

8. The cross-arm member of claim 4, wherein said cross-arm comprises a plurality of first openings and a plurality of insulating members, said plurality of insulating members being insertable into any one or more of said first openings.

9. The cross-arm member of claim 1, including a second opening, said second opening being in communication with said first opening, the cross-arm further comprising a clip element which is insertable into said second opening for attachment to said insulating member such that said insulating member is removeably held in said first opening.

10. The cross-arm member of claim 1, wherein said cross-arm comprises at least one elongated generally horizontal member having a first end, a second end and a center, said cross-arm defining three first openings, one of said openings each being located near said first end and said second end and said center.

11. The cross-arm member of claim 1, wherein said insulating member comprises an elongated rod having a first end and a second end, said first end defining a tab, said cross-arm member defining a slot within said first opening and said tab of said insulating member being seatable within said slot such that said insulating member can only be inserted into said opening at a desired orientation.

12. The cross-arm member of claim 11, wherein said insulating member further comprises two parallel slots near said first end and said cross-arm member defines a second opening such that when said insulating member is placed into said first opening and said tab is seated in said slot within said opening, said slots in said insulating member are in communication with said second opening in said cross-arm member.

13. The cross-arm member of claim 12, including a clip insertable in said second opening in said cross-arm member, when said insulating member is seated in said slot within said opening, and engageable with said slots in said insulating member, said clip releasably holding said insulating member in said cross-arm member.

14. A lightweight electrical utility cross arm for quick and easy assembly of an electrical transmission member for carrying electrical wires, comprising:
   a cross-arm member, generally comprised of two halves attached together, wherein a single identical mold is used for both of the two halves;
   said cross-arm comprising at least one elongated generally horizontal member having a first end, a second end and a center, said cross-arm defining three first openings, one of said openings each being located near said first end and said second end arid said center;
   said cross-arm member defining a plurality of second openings, each of said second openings intersecting one of said first openings;
   a plurality of insulating members, one of said plurality of insulating members being insertable into any one of said first openings;
   each insulating member comprising an elongated rod having a first end and a second end, said first end defining a tab, said cross-arm member defining a slot within each of said first openings and said tab of said insulating member being seatable within a said slot such that said insulating member can only be seated in a first opening in a desirable orientation;
   said insulating members further defining two parallel slots near said first end such that when said insulating member is placed into one of said first openings and said tab is seated in said slot within said first opening, said slots defined in said insulating member are in communication with said second opening in said cross-arm member;
   a clip element for holding said insulating member in said first opening, said clip element being insertable in said second opening in said cross-arm member when said insulating member is seated in said slot within said opening, said clip releasably holding said insulating member in said cross-arm member; and
   a wire holding member for insertion onto said insulating member, said wire holding member being held in place on said insulating member by the weight of an electrical wire.

15. The cross-arm member of claim 14, wherein both halves of the cross-arm member are constructed of plastic.

16. The cross-arm member of claim 14, wherein both halves of the cross-arm member are constructed of polymer resin.

17. The cross-arm of claim 14 wherein each half comprises a plurality of tab elements and a plurality of slot elements such that when two halves are assembled together the tab and slot elements of one of said halves interact with corresponding ones of the slot and tab elements of the other of said halves.

18. A lightweight electrical utility cross arm for quick and easy assembly of an electrical transmission member for carrying electrical wires, comprising:

a cross-arm member having a top surface and a front surface and at least one generally vertical opening defined through the top surface and at least one generally horizontal opening through said front surface, said at least one generally vertical opening and said at least one generally horizontal openings intersecting each other;

at least one insulating member for insertion into said opening in the top surface of the cross-arm member;

a clip element for holding the insulating member in the opening;

a wire holding member for placement onto said insulating member, said wire holding member being held in place on said insulating member by the weight of an electrical wire.

19. The cross-arm member of claim 18, wherein the cross-arms is constructed of plastic.

20. The cross-arm member of claim 18, wherein the cross-arm is molded from a single mold design.

21. A method of providing a support for a high voltage electrical wire including the steps of:

providing a cross-arm member having a top surface and a front surface and at least one generally vertical opening defined through the top surface and defining a generally horizontal opening defined through the front surface and intersecting the opening in the top surface;

providing at least one insulating member for insertion into the at least one opening in the top surface of the cross-arm member;

providing a clip element for holding the insulating member in the opening;

providing a wire holder;

attaching said cross-arm member to an utility pole;

inserting at least one insulating member into the opening defined in the cross-arm;

dipping the insulating member within the cross-arm;

lacing said wire holder onto the insulating member; and placing the electrical wire on the wire holding member.

22. The method of providing a support for a high voltage electrical wire of claim 21, including the steps of:

providing a second insulating member;

inserting said second insulating member into a second opening in said top surface of said cross-arm;

providing a second wire holder;

placing said second wire holder onto said second insulating member; and placing a second electrical wire on said second wire holder.

\* \* \* \* \*

UNITED STATES PATENT AND TRADEMARK OFFICE
CERTIFICATE OF CORRECTION

PATENT NO. : 6,667,442 B1
DATED : December 23, 2003
INVENTOR(S) : Lloyd Hilligoss It is certified that error appears in the above-identified patent and that said Letters Patent is hereby corrected as shown below:

<u>Column 7,</u>
Line 35, the word "system" should be omitted.
Line 38, the phrase "dip element" should be changed to -- clip element --.

<u>Column 10,</u>
Line 16, the word "dipping" should be changed to -- clipping --.
Line 17, the word "lacing" should be changed to -- placing --.

Signed and Sealed this

Twentieth Day of April, 2004

JON W. DUDAS
*Acting Director of the United States Patent and Trademark Office*